United States Patent
Ma et al.

(10) Patent No.: US 8,614,677 B2
(45) Date of Patent: Dec. 24, 2013

(54) MOUSE WITH ADJUSTABLE SWITCH

(75) Inventors: Mou-Ming Ma, Taipei Hsien (TW); Shu-I Chen, Taipei Hsien (TW)

(73) Assignee: Giga-Byte Technology Co., Ltd., New Taipei (TW)

( * ) Notice: Subject to any disclaimer, the term of this patent is extended or adjusted under 35 U.S.C. 154(b) by 432 days.

(21) Appl. No.: 12/917,491

(22) Filed: Nov. 2, 2010

(65) Prior Publication Data
US 2012/0105330 A1   May 3, 2012

(51) Int. Cl.
*G06F 3/033* (2013.01)
*G09G 5/08* (2006.01)

(52) U.S. Cl.
USPC .......................................... 345/163; 345/156

(58) Field of Classification Search
USPC .................................. 345/156–173
See application file for complete search history.

(56) References Cited

U.S. PATENT DOCUMENTS

| | | |
|---|---|---|
| 5,374,942 A | 12/1994 | Gilligan et al. |
| 6,323,842 B1 * | 11/2001 | Krukovsky .................... 345/163 |
| 2007/0222755 A1 * | 9/2007 | Kajihara ........................ 345/163 |
| 2010/0164868 A1 | 7/2010 | Wu |
| 2011/0279371 A1 * | 11/2011 | Ma ................................ 345/163 |

FOREIGN PATENT DOCUMENTS

TW    M319473    9/2007

OTHER PUBLICATIONS

"Office Action of Taiwan Counterpart Application", issued on Jul. 25, 2013, p1-p9.

* cited by examiner

*Primary Examiner* — Kevin M Nguyen
*Assistant Examiner* — Kenneth B Lee, Jr.
(74) *Attorney, Agent, or Firm* — Chun-Ming Shih

(57) ABSTRACT

A mouse with adjustable switch is provided. The mouse includes a bottom cover, a switch assembly, a main board and a top cover. The switch assemblies are movably disposed on the bottom cover, where the switch assemblies may slide along a moving direction relative to the bottom cover. The main board is disposed on the bottom cover and electrically connected with the switch assemblies. The top cover is assembled with the bottom cover, and the switch assembly and the main board are accommodated between the top cover and the bottom cover.

13 Claims, 9 Drawing Sheets

MOUSE WITH ADJUSTABLE SWITCH

BACKGROUND OF THE INVENTION

1. Field of the Invention

The invention relates to a mouse and more particularly to a mouse with adjustable switch that satisfies personal usage habits.

2. Description of Related Art

With the population of computers, the time of white collars spend on using computers for documentary processing becomes longer. In conventional mice, switch devices inside left and right buttons has specific positions relative to internal boards (or are disposed directly on internal boards). Thus, when a user uses a mouse with a fixed posture for a long time, hand fatigue may result so as to cause wrist injury.

Moreover, as every user has different usage habits, mice mass produced and having identical shapes cannot satisfy the usage needs of every user. Specifically, the lengths of fingers, the curvatures of palms when holding the mice, and the force exerted on the mice of every user are different. These factors all affect the force exerted on the button of the mouse by the user and the oscillation of the force arm of the button so as to trigger the switch.

Consequently, it is an important task to provide a mouse that satisfies the personal usage of the user so as to alleviate the fatigue and injury resulting from long period use of mouse.

SUMMARY OF THE INVENTION

The invention is directed to a mouse with adjustable switch capable of satisfying usage habits of each user.

The invention is directed to a mouse with adjustable switch including a bottom cover, a switch assembly, a main board, and a top cover. The switch assembly is movably disposed on the bottom cover to slide along a moving direction relative to the bottom cover. The main board is disposed on the bottom cover and electrically connected with the switch assemblies. The top cover is assembled with the bottom cover. The switch assembly and the main board are accommodated between the top cover and the bottom cover.

In one embodiment of the mouse with adjustable switch in the invention, the top cover has a button and the switch assembly is disposed corresponding to the button. The mouse further includes a roller disposed in the button.

In one embodiment of the mouse with adjustable switch in the invention, the switch assembly includes a base, a switch board, and a switch. The base is moveably disposed on the bottom cover and the switch board is disposed on the base. The switch is disposed on the switch board. The bottom cover has a first positioning portion and a second positioning portion is disposed on a surface of the base facing the bottom cover. The second positioning portion and the first positioning portion are lodged correspondingly to determine a position of the base relative to the bottom cover. One of the first positioning portion and the second positioning portion is a groove while the other one is a protrusion. The bottom cover has a position limiting portion disposed on a moving path of the bases so as to limit a moving distance of the base relative to the bottom cover. The position limiting portions are convex ribs. The switch assembly further has a deflector rod disposed on one side of the base and protruding outside of the bottom cover. The bottom cover has a first position limiting portion and the base has a second position limiting portion. The first position limiting portion and the second position limiting portion interfere with each other so as to limit a moving distance of the base relative to the bottom cover. One of the first position limiting portion and the second position limiting portion is a convex axis while the other one is a rectangular frame, and the convex axis is disposed in an opening of the rectangular frame. The mouse with adjustable switch further includes a knob with a portion exposed outside of the bottom cover and another portion connected to the switch assembly for turning the knob so as to move the switch assembly.

In one embodiment of the mouse with adjustable switch in the invention, the mouse further includes a knob with a portion exposed outside of the bottom cover and another portion connected to the switch assembly for turning the knob so as to move the switch assembly. A portion of the knob is a gear and the switch assembly has a sawtooth scale part, and the gear is engaged to the sawtooth scale portion of the switch assembly. The knob further has at least one protrusion portion located in the portion of the knob exposed outside of the bottom cover, and a position of the protrusion portion determines a position of the switch assembly relative to the bottom cover.

In one embodiment of the mouse with adjustable switch in the invention, the mouse further includes a flexible flat cable connected between the switch assembly and the main board.

In light of the foregoing, the switch assembly of the mouse with adjustable switch in the invention can move relative to the bottom cover, so that a user can adjust a position of the switch relative to the button according to his/her usage habits for the user to click the mouse with the usual force.

In order to make the aforementioned and other features and advantages of the invention more comprehensible, several embodiments accompanied with figures are described in detail below.

BRIEF DESCRIPTION OF THE DRAWINGS

The accompanying drawings are included to provide further understanding, and are incorporated in and constitute a portion of this specification. The drawings illustrate exemplary embodiments and, together with the description, serve to explain the principles of the disclosure.

DESCRIPTION OF EMBODIMENTS

A switch assembly of a mouse in the invention moves relative to a bottom cover, so that a user can adjust a switch of the switch assembly relative to a position of a button of a top cover and change force arm to determine a force exerting on the button of the top cover of the mouse according to usage habits of each user, so as to alleviate fatigue and injury of the user caused by long period use of mouse.

The following embodiments merely illustrate the implementations of the switch assembly moving relative to the bottom cover. However, persons skilled in the art can have alterations according to actual demands without departing the scope of the invention.

First Embodiment

Figure 1:
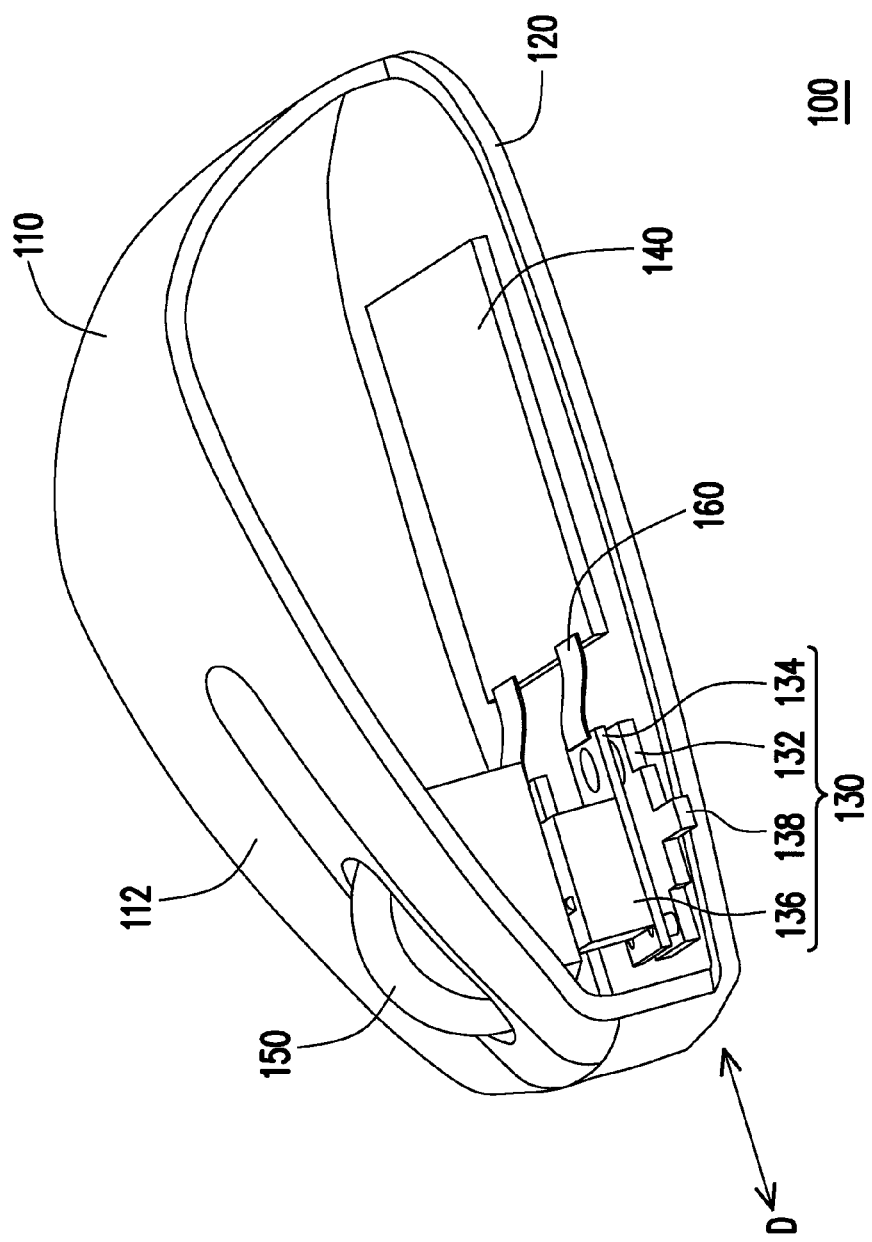
FIG. 1 is a schematic three-dimensional diagram illustrating a mouse of the invention.
Figure 2:
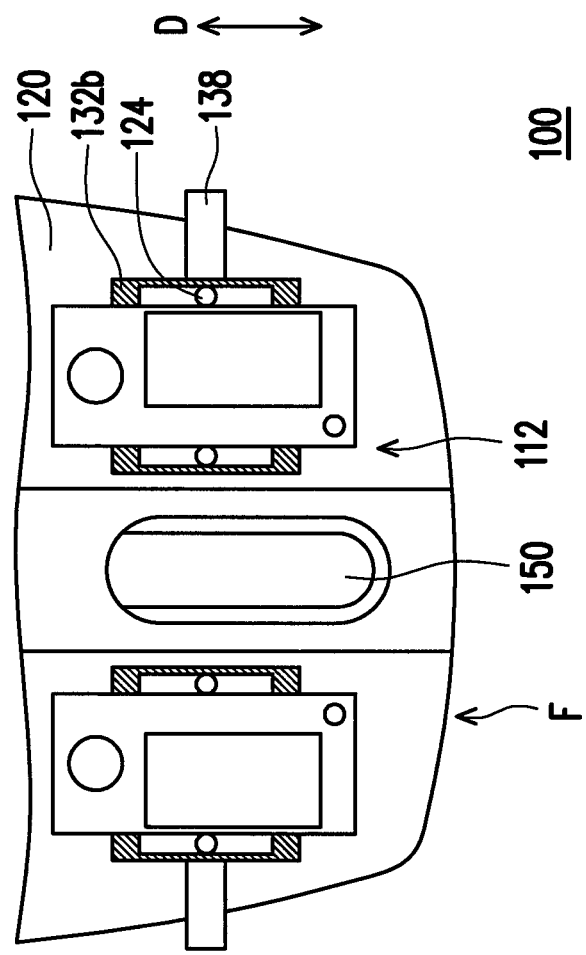
FIG. 2 is a partial perspective diagram of the mouse in FIG. 1.

FIG. 1 is a schematic three-dimensional diagram illustrating a mouse of the invention. FIG. 2 is a partial perspective diagram of the mouse in FIG. 1. Referring to FIGS. 1 and 2, a mouse with adjustable switch 100 includes a top cover 110, a bottom cover 120, a switch assembly 130, and a main board 140. The bottom cover 120 and the top cover 110 are assembled. The switch assembly 130 is moveably disposed on the bottom cover 120. The switch assembly 130 is suitable for sliding along a moving direction D relative to the bottom cover 120. The main board 140 is disposed on the bottom cover 120 and electrically connected to the switch assembly 130. The switch assembly 130 and the main board 140 are accommodated between the top cover 110 and the bottom cover 120.

Accordingly, the top cover 110 has a button 112 and the switch assembly 130 is disposed corresponding to the button 112. The mouse 100 further includes a roller 150 disposed in the button 112. The switch assembly 130 includes a base 132, a switch board 134, and a switch 136. The base 132 is moveably disposed on the bottom cover 120. The switch board 134 is disposed on the base 132 and suitable to be driven by the base 132 so as to slide along the moving direction D relative to the bottom cover 120. The switch 136 is disposed on the switch board 132. Moreover, the switch assembly 130 further has a deflector rod 138 disposed on one side of the base 132 and protruding outside of the bottom cover 120.

Figure 3:
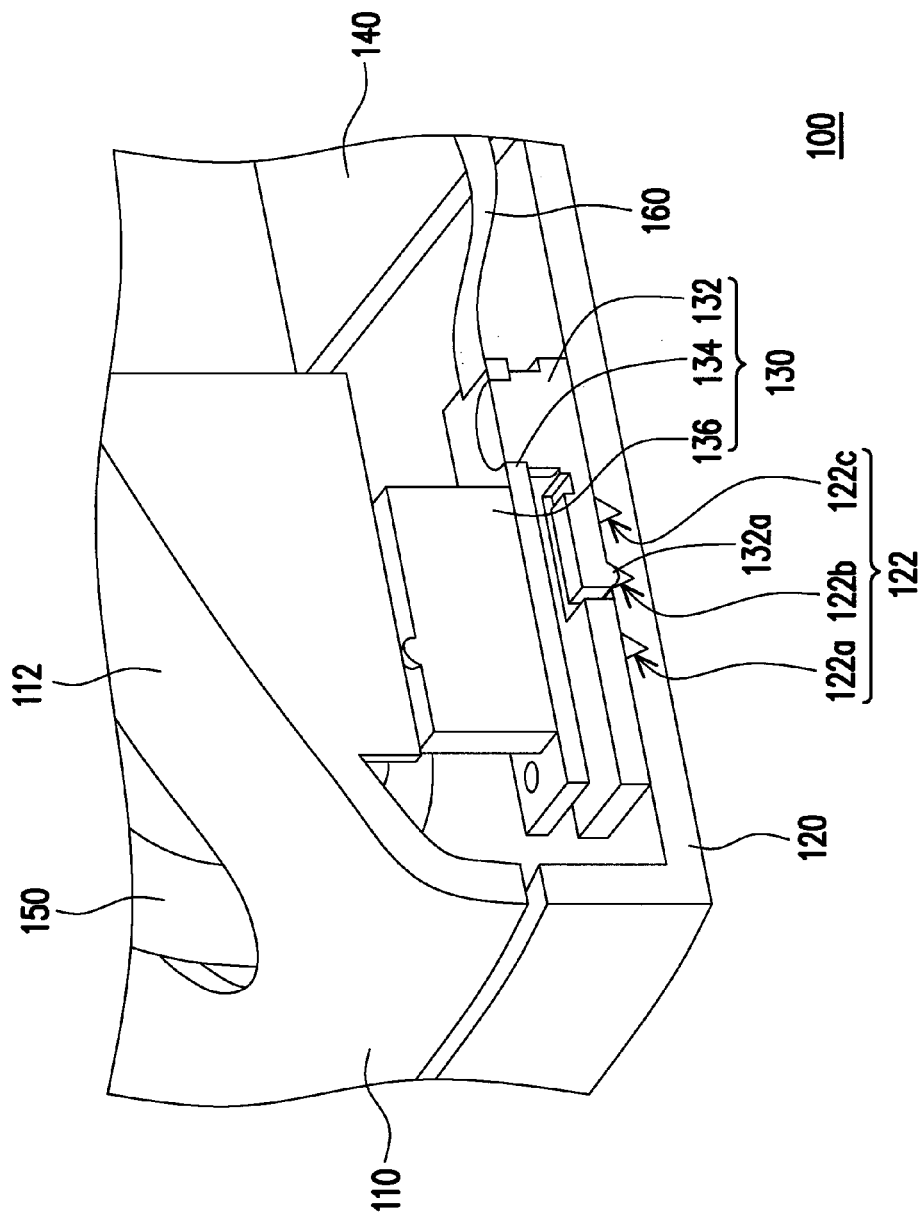
FIG. 3 is a cross-sectional three-dimensional diagram of the mouse in FIG. 1.

FIG. 3 is a cross-sectional three-dimensional diagram of the mouse in FIG. 1. Referring to FIGS. 1, 2 simultaneously, and 3, the bottom cover 120 has a first positioning portion 122 and a second positioning portion 132a is disposed on a surface of each base 132 facing the bottom cover 120. In the present embodiment, the first positioning portion 122 is defined by a plurality of grooves 122a, 122b, 122c, and the second positioning portion 132a is a protrusion. The second positioning portion 132a is lodged to one of the grooves 122a, 122b, or 122c of the first positioning portion 122 correspondingly to determine a position of the base 132 relative to the bottom cover 120. The first positioning portion 122 of the present embodiment is defined by a plurality of grooves 122a, 122b, and 122c. Here, the second positioning portion 132a being a protrusion is merely an illustration. In other embodiments not illustrated herein, the first positioning portion 122 can be a protrusion while the second positioning portion 132a includes a plurality of grooves. Alternatively, the protrusion and the grooves can be replaced by other structures that can co-operate with each other for positioning.

Referring to FIGS. 1, 2, and 3 simultaneously, the bottom cover 120 further has a first position limiting portion 124 and the base 132 has a second position limiting portion 132b. In the present embodiment, the first position limiting portion 124 is a convex axis and the second position limiting portion 132b is a rectangular frame, and the convex axis is disposed in an opening of the rectangular frame. A moving distance of the base 132 relative to the bottom cover 120 is limited through an interference of the first position limiting portion 124 and the second position limiting portion 132b.

Figure 4:
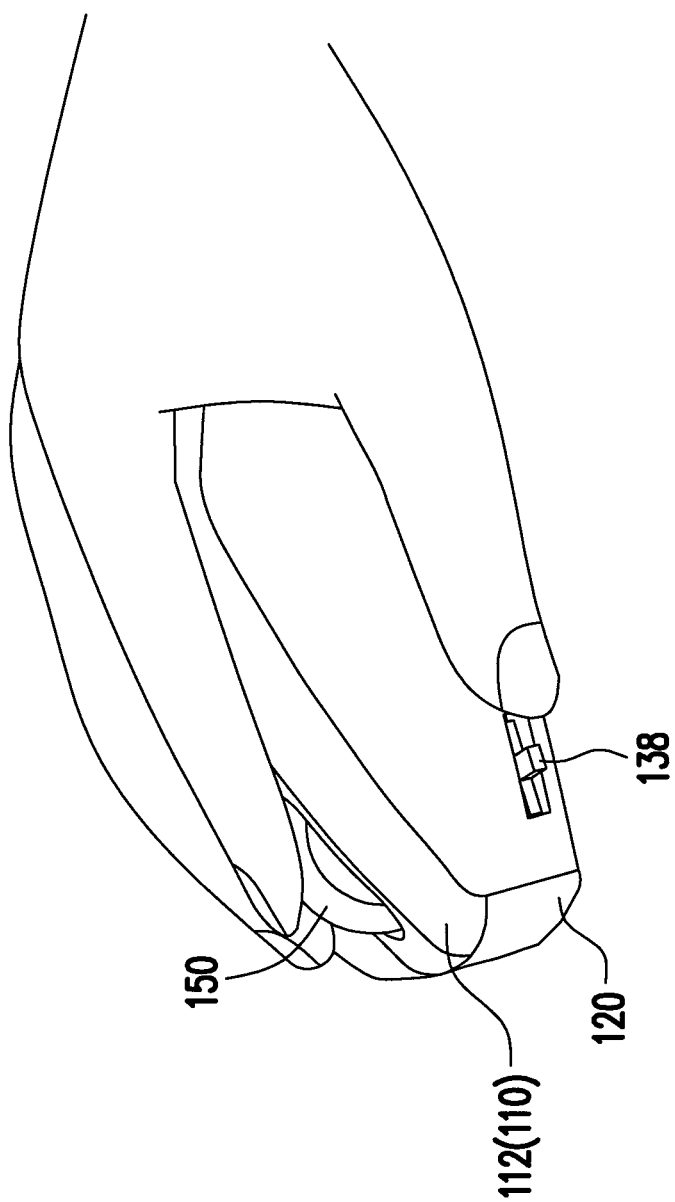
FIG. 4 is a schematic diagram showing a user holding the mouse depicted in FIG. 1.
Figure 5:
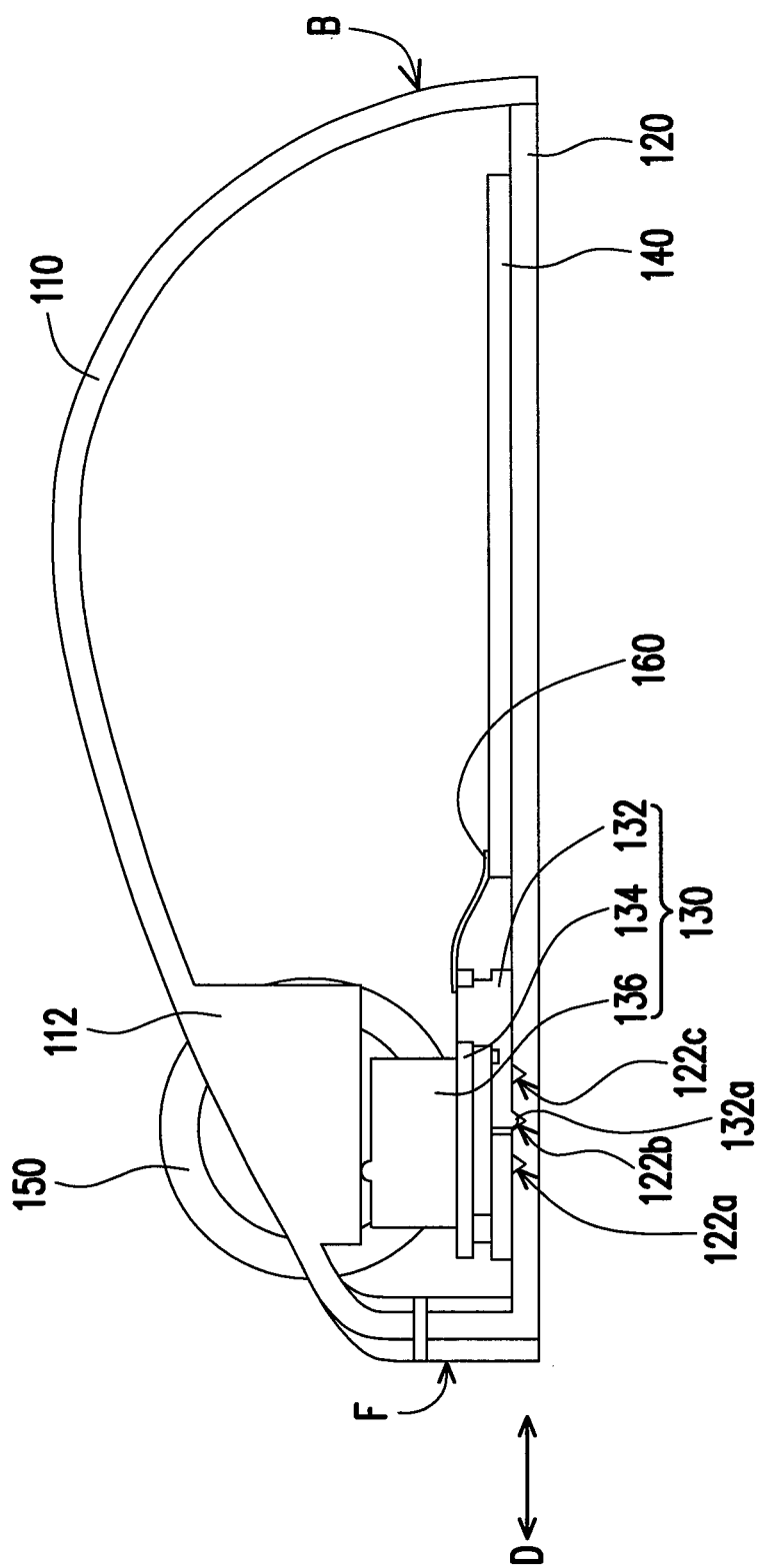
FIGS. 5-7 are schematic diagrams showing changes of a position of a switch assembly relative to a bottom cover.
Figure 6:
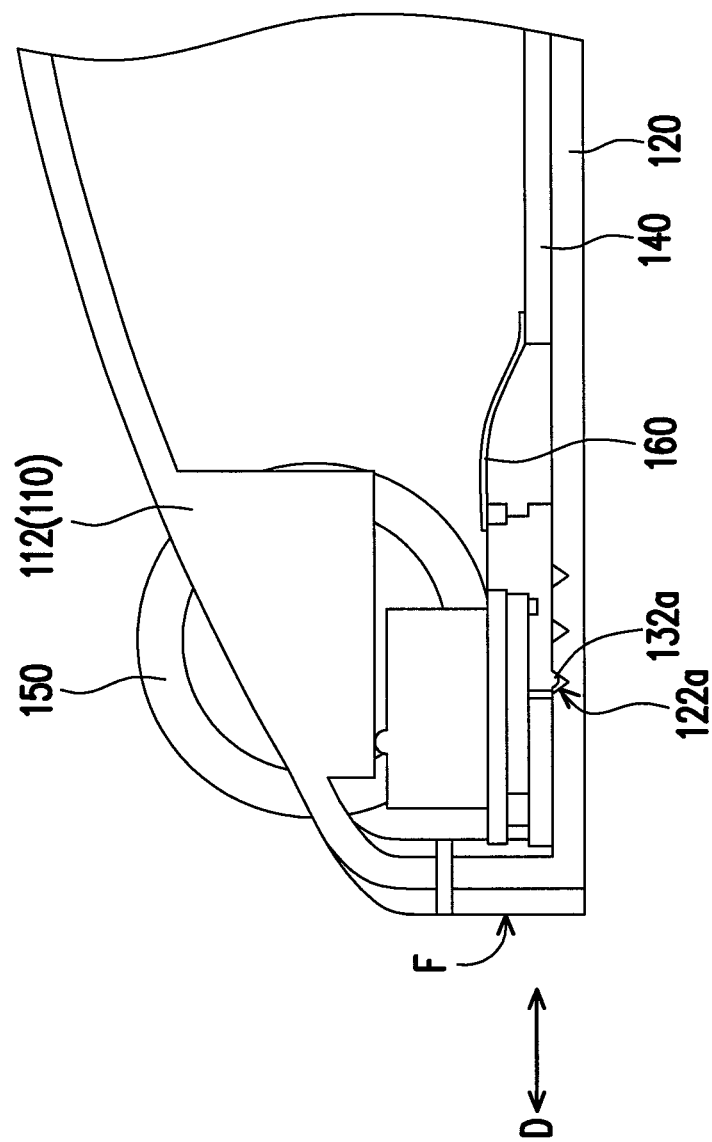
Figure 7:
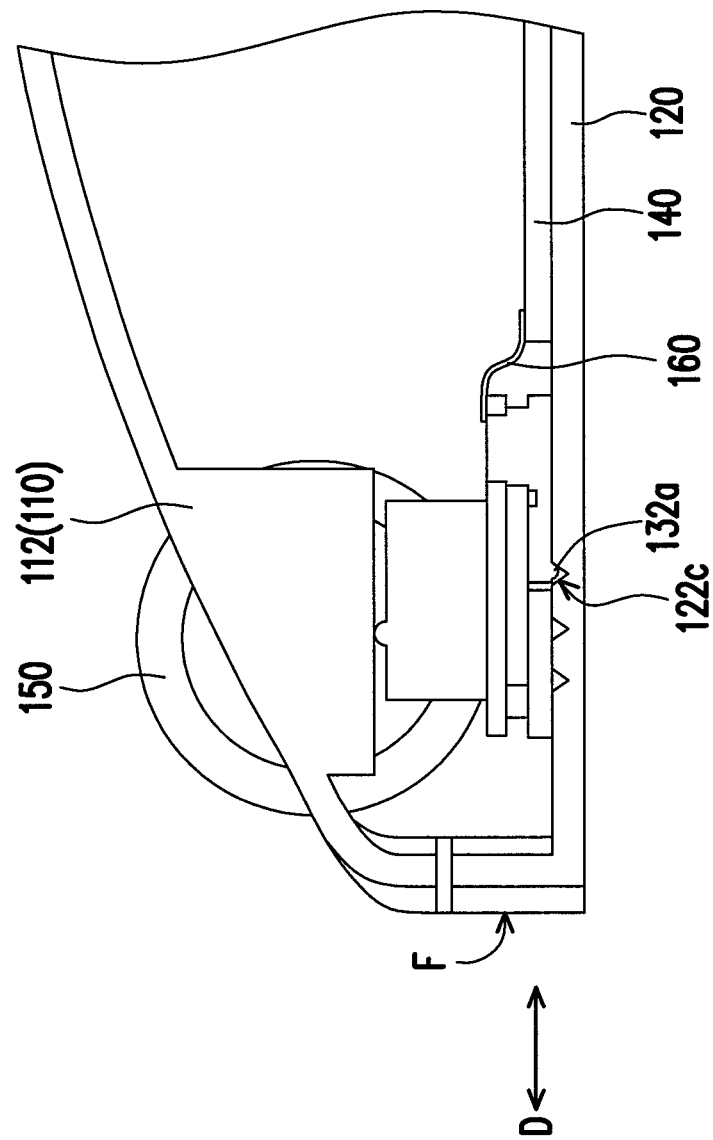

FIG. 4 is a schematic diagram showing a user holding the mouse depicted in FIG. 1. FIGS. 5-7 are schematic diagrams showing changes of a position of the switch assembly relative to the bottom cover. Referring to FIGS. 4 and 5 simultaneously, when a user adopts the mouse 100 of the present embodiment, the user's palm covers the top cover 110 of the mouse 100, where the index finger and the middle finger are placed on the two buttons 112 respectively and the thumb and the ring finger (or the little finger) lean against the sides of the mouse 100.

As shown in FIG. 5, the second positioning portion 132s of the base 132 in the switch assembly 130 in the present embodiment corresponds to one of the grooves 122b in the first positioning portion 122. When used normally, the user can key in commands by clicking the button 112 with the index finger or the middle finger and scroll down the window by rolling the roller 150 with the index finger or the middle finger. When the user clicks the button 112, the button 112 is pressed downward to contact the switch 136 so as to generate a signal. The switch board 134 then transmits the signal to a circuit board in a computer host through the main board 140 in the mouse 100 and shows cursor on the monitor or executes a program.

In particular, when the user feels that the force exerted on the button 112 by the finger needs to be increased or decreased when clicking the button 112, the force arm used to click the button 112 for triggering the switch 136 is not suitable for the user. At this time, the user can flick the deflector rods 138 protruding from two sides of the bottom cover 120 of the mouse 100 with the thumb or the ring finger to change a relative position of the switch assembly 130 and the bottom cover 120, such that the user can use the mouse 100 in a more suitable and comfortable manner.

Referring to FIGS. 1, 2, and 5 simultaneously, in details, when the user feels that the force exerted on the button 112 by the finger needs to be excessively increased when clicking the button 112, this means that the force arm used to click the button 112 for triggering the switch 136 is too short. At this time, the deflector rod 138 is flicked toward a front side F of the mouse 100. The force exerted on the deflector rod 138 causes the base 132 of the switch assembly 130 to slide along the moving direction D, as shown in FIG. 6. Here, comparing to the switch 136 in FIG. 5, the switch 136 in FIG. 6 is located closer to the front, which means the force arm is increased under the same torque, so that the force exerted on the button 112 by the user can be decreased. In other words, the user can click the button 112 with a lighter force.

Additionally, the first position limiting portion 124 disposed on the bottom cover 120 and being a convex axis is located on the base 132 and in the opening of the second position limiting 132b which is a rectangular frame, as shown in FIG. 2. A size of the opening is used to limit the distance of the base 132 sliding relative to the bottom cover 120 and limit the base 132 to slide back and forth only in the moving direction D without any rotation or movement in other directions.

Referring to FIGS. 5 and 6 simultaneously, the second positioning portion 132a, which is the protrusion, detaches from the groove 122b of the first positioning portion 122 on the bottom cover 120 with the movement of the base 132 and is lodged into another groove 122a. The lodge of the protrusion and the groove not only positions the position of the base 132 relative to the bottom cover 120, but also allows the user to feel the position release and the re-lodging of the protrusion and the groove when flicking the deflector rod 138 so as to determine whether the deflector rod 138 should be further flicked or not. In FIGS. 3, 5 to 7, the number of grooves disposed therein is three; however, the invention is not limited thereto, and the number of grooves disposed therein can be changed according to actual demands.

Referring to FIGS. 1, 2, and 5 simultaneously, on the contrary, when the user feels that the force exerted on the button 112 by the finger needs to be excessively decreased when clicking the button 112, this means the force arm used to click the button 112 for triggering the switch 126 is too long. At this time, the deflector rod 138 is flicked toward a back side B of the mouse 100. The force exerted on the deflector rod 138 causes the base 132 of the switch assembly 130 to slide along the moving direction D. The second positioning portion 132a then detaches from the groove 122b and is lodged into the groove 122c with the movement of the base 132, as shown in FIG. 7. Here, comparing to the switch 136 in FIG. 6, the switch 136 in FIG. 7 is located closer to the back, which means the force arm is decreased under the same torque, so that the force exerted on the button 112 by the user can be increased. In other words, the user can click the button 112 with a stronger force.

Accordingly, the user can change the position of the switch assembly 130 relative to the bottom cover 120 so as to adjust the force arm to click the button 112 with the habitual force to meet ergonomics, such that the fatigue and injury caused by long period use of mouse can be alleviated.

As shown in FIG. 1, in order for the switch assembly 130 and the main board 140 to stay electrically connected, the mouse 100 further includes a flexible flat cable 160 (two cables are shown in FIG. 1). The switch assembly 130 is connected to the main board 140 through the flexible flat cables 160. In the present embodiment, the mouse 100 adopts the flexible flat cable 160 to maintain the electrical connection between the switch assembly 130 and the main board 140; however, the invention is not limited thereto. Persons skilled in the art can maintain the electrical connection between the switch assembly 130 and the main board 140 through other methods. For example, a plurality of first joints is disposed on the bottom cover 120 (not shown). These first joints are electrically extended from the main board 140, and each switch assembly 130 has a second joint (not shown). Here, the second joint is extended from the switch board 134 through the base 132. Moreover, the second joint contacts with one of the first joints to establish an electrical connection along with the position of the base 132 relative to the bottom cover 120.

Second Embodiment

The present embodiment is similar to the first embodiment, and the difference between the two lies in a position limiting method limiting a moving path of the switch assembly 130. The following merely illustrates the difference aforementioned.

Figure 8:
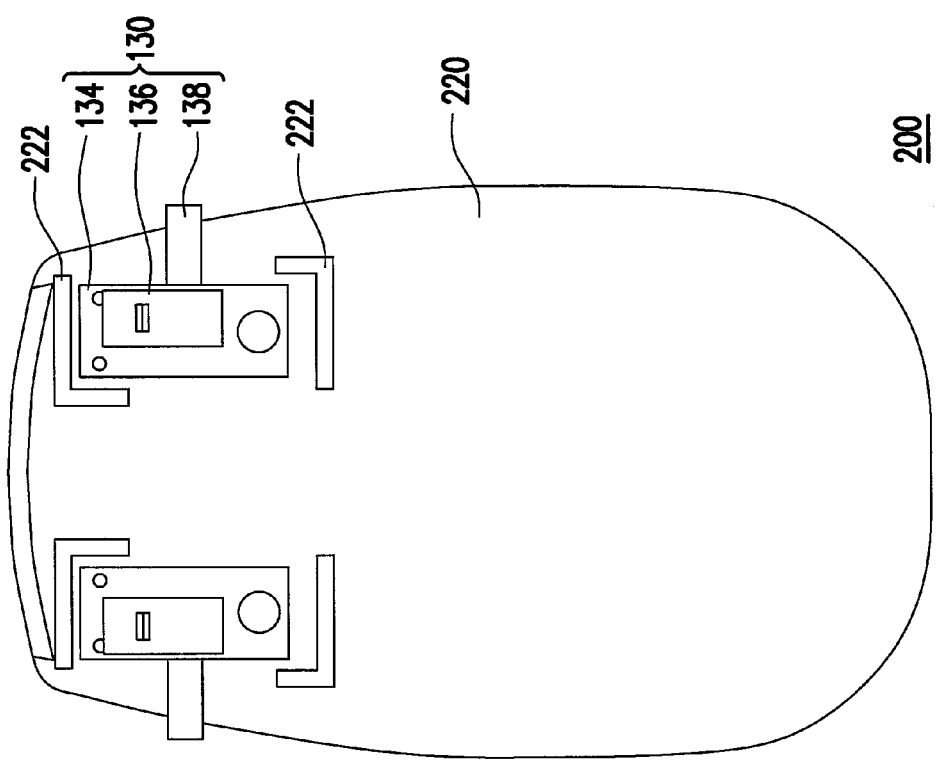
FIG. 8 illustrates a top view of a mouse in a second embodiment of the invention omitting a top cover and a main board.

FIG. 8 shows a top view of a mouse in the second embodiment of the invention. For better illustration, a top cover and a main board are omitted herein and only a bottom cover and a switch assembly are shown. In a mouse 200 of the present embodiment, a method configured to limit a moving path of the switch assembly 130 is to dispose a plurality of position limiting portions 222 on a bottom cover 220, where the position limiting portions 222 are located on the moving path of the switch assembly 130 to limit a moving distance of the switch assembly 130 relative to the bottom cover 220. Here, the position limiting portions 222 are convex ribs with rectangular shapes or L shapes. The shape of the position limiting portions 222 is determined by actual demands.

Third Embodiment

The present embodiment is similar to the first and the second embodiments. However, in the present embodiment, the user has a different flicking method for the switch assembly to slide relative to the bottom cover. The following merely illustrates the difference aforementioned.

Figure 9:
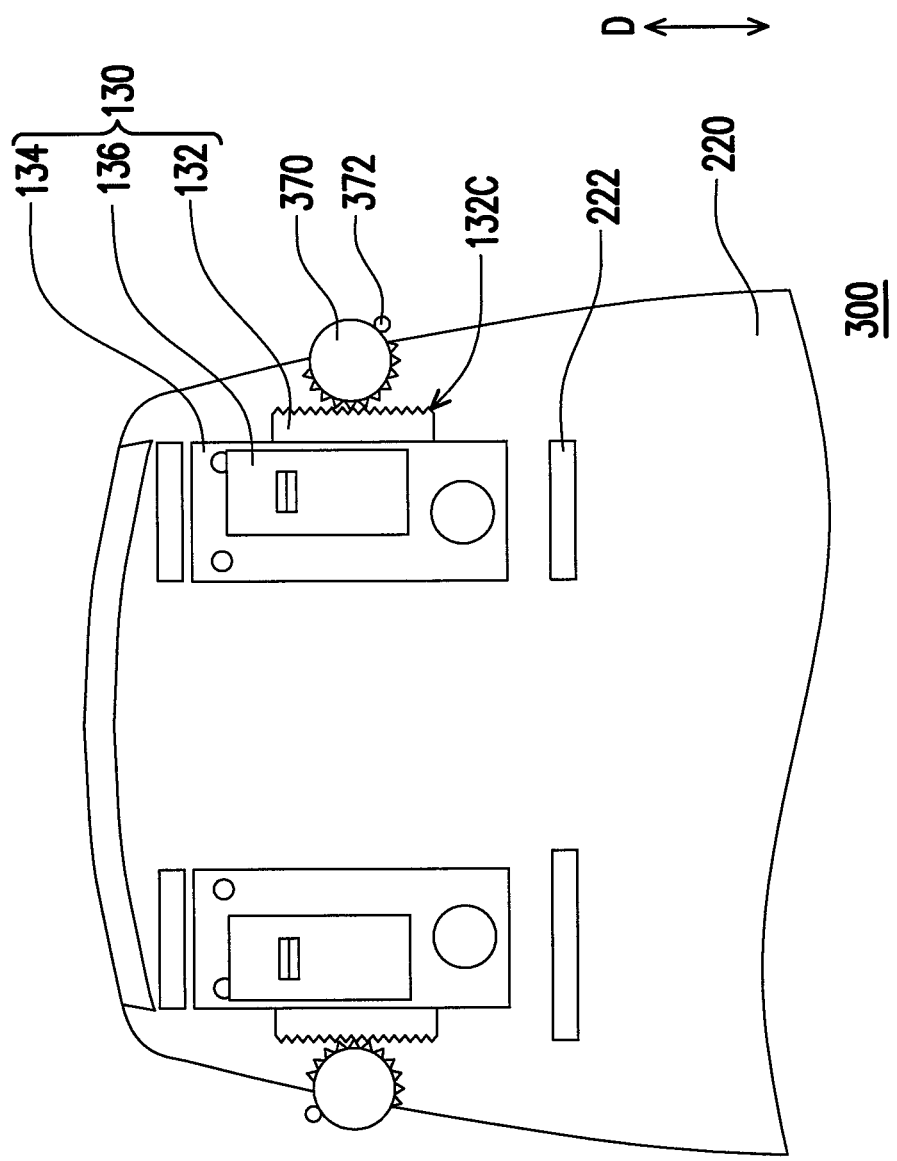
FIG. 9 shows a top view of a mouse in a third embodiment of the invention, where only a bottom cover, a switch assembly, and a knob are depicted.

FIG. 9 shows a top view of a mouse in the third embodiment of the invention. For better illustration, a top cover and a main board are omitted herein and only a bottom cover, a switch assembly, and a knob are shown. Referring to FIG. 9, in the present embodiment, the switch assembly 130 does not include the deflector rod 138 as depicted in the first embodiment. Alternatively, a knob 370 is adopted to slide the switch assembly 130 relative to the bottom cover 220.

In details, a mouse 300 includes the knob 370, where a portion of the knob 370 is exposed outside of the bottom cover 220 and another portion of the knob 370 is connected to the switch assembly 130. As illustrated in FIG. 9, the portion of the knob 370 connected to the switch assembly is a gear in the invention. One side of the base 132 of the switch assembly 130 has a sawtooth scale portion 132c configured to engage with the gear. The disposition of the sawtooth scale portion 132c and the number of sawteeth are determined according to actual demands. One of the implementations is to dispose the sawtooth scale portion 132c in the base 132; however, the invention is not limited thereto.

Similar to the first embodiment, when the user changes the position of the switch assembly 130 relative to the bottom cover 220 according to personal habits or usage demands, the user turns the knob 370 with his/her fingers, so as to drive the switch assembly 130 to slide along the moving direction D through the turning of the knob 370 and the scale 132c from engaging with the knob 370.

In addition, the knob 370 further has at least one protrusion portion 372 located in the portion of the knob 370 exposed outside of the bottom cover 220. Here, the user determines the position of the switch assembly 130 relative to the bottom cover 220 through a position of the protrusion portion 372.

Moreover, similar to the second embodiment, in order to limit the moving distance of the switch assembly 130, a plurality of position limiting portions 222 is disposed on the bottom cover 220. The position limiting portions 222 are convex ribs and located on the moving path of the switch assembly 130. A shape of the convex ribs can change according to actual demands.

In summary, the switch assembly of the mouse in the invention can change the position thereof relative to the bottom cover, so that the user can use the mouse of the invention comfortably with his/her usage demands and habits so as to meet ergonomic demands and alleviate the fatigue and injury may be caused from the long period use of mouse.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A mouse with an adjustable switch, comprising:
a bottom cover;
a top cover assembled with the bottom cover and having a button;
a main board accommodated between the top cover and the bottom cover;
a switch assembly movably disposed on the bottom cover and electrically connected with the main board, and separated from the main board to slide along a moving direction relative to the main board, comprising:
a base moveably disposed on the bottom cover to slide along the moving direction relative to the main board;
a switch board disposed on the base to slide with the base; and
a switch disposed on the switch board,
wherein according to the moving of the base relative to the main board, a relative position of the switch assembly and the button changes and such that a force arm to click the button is adjusted.

2. The mouse with the adjustable switch as claimed in claim 1, further comprising a roller disposed in the button.

3. The mouse with the adjustable switch as claimed in claim 1, wherein the bottom cover has a first position limiting portion and the base has a second position limiting portion, and the first position limiting portion and the second position limiting portion interfere with each other so as to limit a moving distance of the base relative to the bottom cover.

4. The mouse with the adjustable switch as claimed in claim 1, wherein the bottom cover has a position limiting portion disposed on a moving path of the bases so as to limit a moving distance of the base relative to the bottom cover.

5. The mouse with the adjustable switch as claimed in claim 4, wherein the position limiting portions are convex ribs.

6. The mouse with the adjustable switch as claimed in claim 3, wherein one of the first positioning portion and the second positioning portion is a groove while the other one is a protrusion.

7. The mouse with the adjustable switch as claimed in claim 3, wherein one of the first position limiting portion and the second position limiting portion is a convex axis while the other one is a rectangular frame, and the convex axis is disposed in an opening of the rectangular frame.

8. The mouse with the adjustable switch as claimed in claim 1, wherein the switch assembly further comprises a deflector rod disposed on one side of the base and protruding outside of the bottom cover.

9. The mouse with the adjustable switch as claimed in claim 1, further comprising a knob with a portion exposed outside of the bottom cover and another portion connected to the switch assembly for turning the knob so as to move the switch assembly.

10. The mouse with the adjustable switch as claimed in claim 9, wherein a portion of the knob is a gear and the switch assembly has a sawtooth scale part, and the gear is engaged to the sawtooth scale portion of the switch assembly.

11. The mouse with the adjustable switch as claimed in claim 9, wherein the knob further comprises at least one protrusion portion located in the portion of the knob exposed outside of the bottom cover, and a position of the protrusion portion determines a position of the switch assembly relative to the bottom cover.

12. The mouse with the adjustable switch as claimed in claim 1, further comprising a knob with a portion exposed outside of the bottom cover and another portion connected to the switch assembly for turning the knob so as to move the switch assembly.

13. The mouse with the adjustable switch as claimed in claim 1, further comprising a flexible flat cable connected between the switch assembly and the main board.

* * * * *